UNITED STATES PATENT OFFICE.

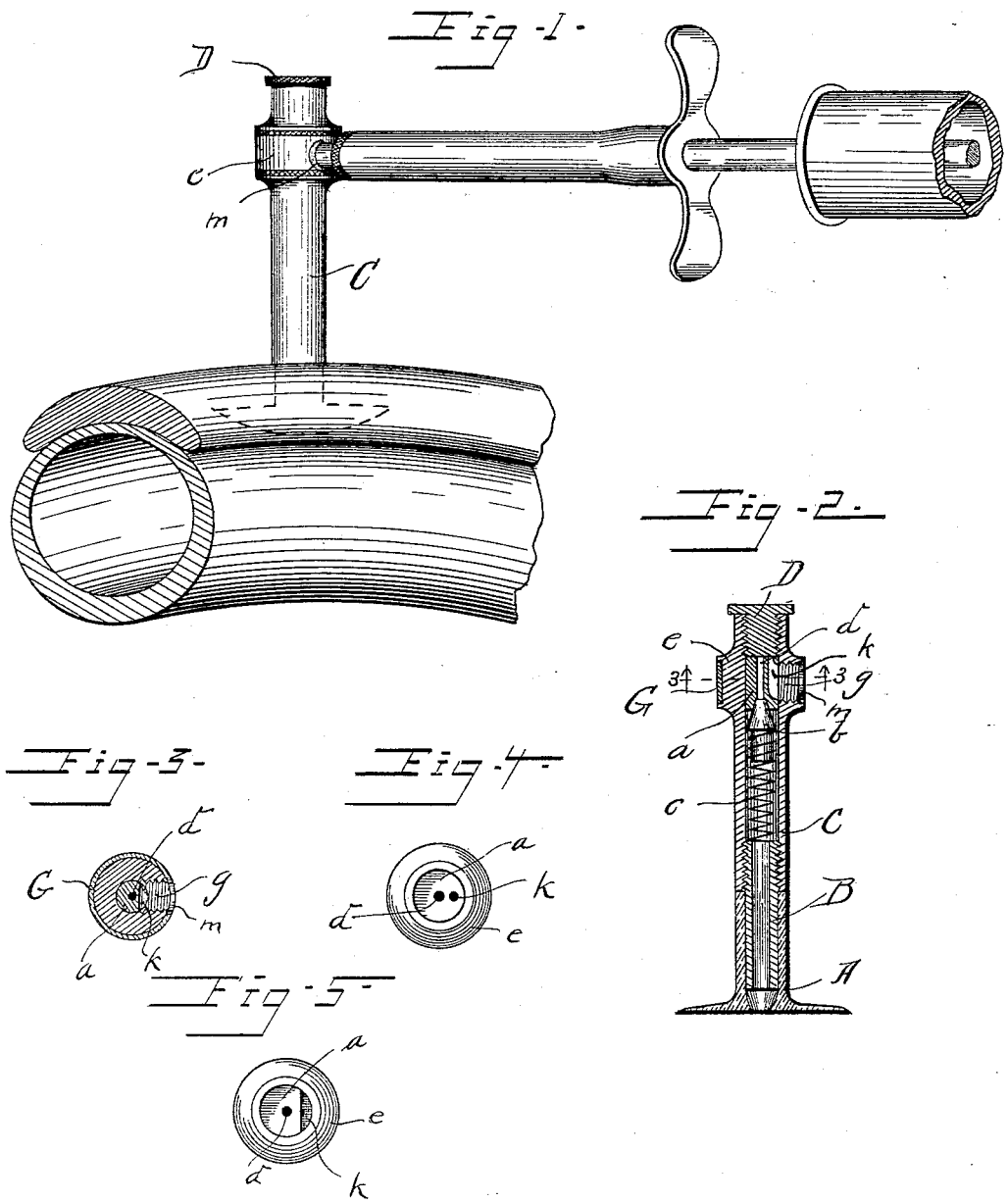

WILLIAM W. ORR, OF CHICAGO, ILLINOIS, ASSIGNOR OF ONE-HALF TO CHARLES F. LUND, OF ELGIN, ILLINOIS.

VALVE FOR PNEUMATIC TIRES.

SPECIFICATION forming part of Letters Patent No. 616,584, dated December 27, 1898.

Application filed March 18, 1898. Serial No. 674,306. (No model.)

*To all whom it may concern:*

Be it known that I, WILLIAM W. ORR, a citizen of the United States, and a resident of Chicago, Cook county, Illinois, have invented certain new and useful Improvements in Valves for Pneumatic Tires, of which the following is a full, clear, and exact description, reference being had to the accompanying drawings and to the letters of reference marked thereon.

The object of my invention is to avoid leakage of the confined air of a pneumatic tire out through the valve and to make said valve absolutely dust-proof. This I accomplish by simple and comparatively inexpensive devices which are much more accessible when it is desired to "blow up" the tire than the common kinds of valves now in extensive use, which devices are hereinafter fully described, and particularly pointed out in the claims.

Figure 1 is a side view of my improved valve, showing it attached to the valve-stem extending from a broken-away portion of a pneumatic tire. Fig. 2 is a vertical longitudinal center section through the same. Fig. 3 is a transverse section taken on dotted line 3 3, Fig. 2, looking in the direction indicated by the arrows. Fig. 4 is a top view with the screw-cap removed, and Fig. 5 is a similar view showing a slight modification of the bushing.

In the drawings, A represents the flexible valve-stem of a pneumatic tire, and B a metallic nipple of suitable length, which is inserted and secured in the bore of said stem in any suitable manner. The end of this nipple B, extending out of said stem, is screw-threaded and is tapped into the interiorly-screw-threaded lower end of the bore of the tube C. The bore of this tube is preferably of the same diameter its entire length, and the major portion of its outer circumference is about the same diameter as the valve-stem. At a point nearer the upper end of tube C the bore thereof has a bushing inserted in it which provides a restricted passage $d$ therethrough, connecting the upper and lower portions of said bore, and between this bushing $a$ and the upper end of the nipple there is a valve $b$, whose upper conical-shaped end is normally kept bearing up against the corresponding countersunk lower end of passage $d$ by a coil expansion-spring $c$ to close the same.

The upper portion of the bore of tube C, above the bushing $a$ thereof, is interiorly screw-threaded and is provided with a screw-cap D, the threaded barrel of which is of such length that when the milled head thereof bears against the upper annular edges of the tube its lower end will bear tightly down over the upper end of said restricted passage $d$ and effectually close the same. The outer circumference $e$ of the tube, coming in the same transverse plane as bushing $a$, is preferably increased in diameter, as shown, and is provided with an interiorly-threaded radial opening $g$, which extends into said bushing. The inner recess of this opening $g$ is connected with the bore of the tube C above the bushing by drilling a longitudinal air-duct $k$ in the bushing from its end nearest the screw-cap D and parallel with and between the restricted passage $d$ thereof and its outer walls, or by flattening the said outer walls of said bushing in longitudinal alinement with the said inner recess of opening $g$, or in any other suitable manner. Surrounding the outer circumference of this wider portion $e$ of tube C is a close-fitting metallic zone or band G, which is broad enough to close opening $g$, and has an opening $m$ therein of a diameter corresponding to or slightly greater than the opening $g$. This zone G has its outer surface milled, so as to afford an easy grasp for the fingers with which to turn it to either bring opening $m$ in radial alinement with opening $g$, so as to open the same, or to carry said opening $m$ out of register with opening $g$ to close the same.

If desired, that portion of the wider portion $e$ of tube C with which zone G comes in contact may be depressed, so as to afford a seat for the said zone from which it cannot be displaced.

The opening $g$ is of such diameter that when the zone G is turned in the proper position the nipple of a bicycle or other suitable air-pump can be screwed into the same. When it is desired to pump air into the tire, the screw-cap D is turned, so as to open the passage $d$ in the bushing, and then the air is forced through opening g, through the air-duct, and through the restricted passage in the bushing into the tire. When sufficient air is pumped into the tire, the screw-cap is screwed down, so as to close the passage d, and then the pump is disconnected and zone G moved, so as to close opening g.

If desired, the valve b and the spring c, engaging the same, may be dispensed with.

I do not desire to be restricted to the exact dimensions of my improved valve as shown and described, because it is obvious that these may be changed without materially altering the action of the invention or departing from the spirit thereof. All such changes I desire to be considered as falling within the scope of my invention.

What I claim as new is—

1. A valve consisting of a tube having a lateral intake-opening through one side, a bushing inserted in the bore thereof having a restricted longitudinal passage through it and having an air-duct pneumatically connecting said intake-opening thereof with the bore of the tube above the bushing, a valve d engaging the lower end of said restricted passage in the bushing and an expansion-spring normally keeping said valve closed, in combination with a screw-cap screwed into the upper end of the bore of the tube and adapted to close said restricted opening.

2. A valve consisting of a tube having a lateral intake-opening through one side, a bushing inserted in the bore thereof having a restricted longitudinal passage through it, and having an air-duct pneumatically connecting said intake-opening with the bore of the tube above the bushing, a revoluble zone or band surrounding said tube and having an opening m therein and adapted to open and close said intake-opening, in combination with a screw-cap screwed into the upper end of the bore of the tube and adapted to close said restricted opening, as set forth.

3. A valve consisting of a tube having a lateral intake-opening through one side, a bushing inserted in the bore thereof, having a restricted longitudinal passage through it, and an air-duct pneumatically connecting said intake-opening with the bore of the tube above the bushing, in combination with a revoluble circumferential zone or band having an opening m therein and seated in a depressed portion of the outer circumference of said tube and adapted to open and close said intake-opening, and a screw-cap screwed into the upper end of the bore of the tube and adapted to close said restricted opening in the bushing, as set forth.

4. A valve consisting of a tube having a lateral intake-opening through one side, a bushing inserted in the bore thereof having a restricted longitudinal passage through it and having an air-duct pneumatically connecting said intake-opening with the bore of the tube above the bushing, a valve d engaging the lower end of said restricted passage, an expansion-spring c normally keeping said valve closed, a revoluble circumferential zone or band having an opening m therein and seated in a depressed portion of the outer circumference of said tube and adapted to open and close said intake-opening, in combination with a screw-cap screwed into the upper end of the bore of the tube and adapted to close said restricted opening in the bushing, as set forth.

WILLIAM W. ORR.

Witnesses:
CHAS. F. LUND,
FRANK D. THOMASON.